W. B. CLOSSON.
Finger-Ring.
No. 203,323. Patented May 7, 1878.
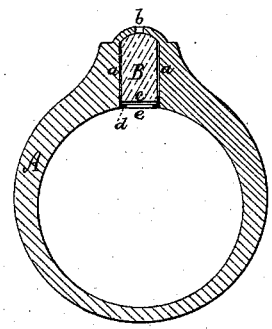
Witnesses.
S. N. Piper
S. [illegible]
Inventor;
Wm. B. Closson
by his attorney.
R. H. Eddy

UNITED STATES PATENT OFFICE.

WILLIAM B. CLOSSON, OF BOSTON, MASSACHUSETTS.

IMPROVEMENT IN FINGER-RINGS.

Specification forming part of Letters Patent No. 203,323, dated May 7, 1878; application filed November 27, 1877.

*To all whom it may concern:*

Be it known that I, WILLIAM B. CLOSSON, of Boston, of the county of Suffolk and State of Massachusetts, have invented a new and useful Improvement in the Manufacture of Finger-Rings; and do hereby declare the same to be described in the following specification and represented in the accompanying drawing, which is a section of a finger-ring embracing my invention, which consists in a ring having within it a lens and a picture and eye and light apertures, as set forth.

In the drawing, A denotes a finger-ring provided with a socket, $a$, for the reception of a glass or cylindrical plano-convex lens, B, which is arranged therein, as shown. The crown of the socket is closed, except in having in its center an aperture, $b$, for the eye to look through into the lens, and through such to a picture, $c$, applied to the lower or plane end of the lens. This picture is to be made on a transparent medium, such as gelatine, for instance, and may be a minute photograph.

The socket at its lower end is provided with a cap or guard, $d$, which has in it a light passage or aperture, $e$. The cap is to fit into the socket, and to be flush or about so with the inner periphery of the ring. On looking through the eye-hole into the lens the picture will be seen as magnified.

Sometimes I arrange the socket and lens transversely in the head of the ring, in which case the eye and light apertures would be in the sides of the head.

I make no claim to a lens and object arranged and fixed in a case hinged to a ring, so as to open therefrom or close into it, substantially as represented in the United States Patent No. 33,031, dated August 13, 1861, wherein the ring is shown as having no eye and light apertures made in it, as is the case with my ring, and the microscope is shown as so hinged or applied that before it can be used by a person to see the object within it, it has to be drawn or pulled out of the ring-socket.

I claim—

1. A finger-ring having eye and light openings leading out of its socketed head, and also having within the socket $a$ of the head, and between such openings, a lens and a picture, all being substantially as described.

2. A ring having an eye-opening, $b$, leading out of its socketed head, and also having within the socket $a$ of such head a lens, B, and a picture, $c$, held in place in the said socket by a perforated cap or guard, $d$, inserted in the inner end thereof, and provided with a light-aperture, $e$, all as set forth.

WILLIAM B. CLOSSON.

Witnesses:
R. H. EDDY,
JOHN R. SNOW.